United States Patent

Hauser et al.

[11] Patent Number: 5,911,922
[45] Date of Patent: *Jun. 15, 1999

[54] MASS TRANSFER DEVICE

[75] Inventors: Richard P. Hauser, Ravenna; Bruce C. Taylor; John Harris, both of Kent; Joe Schirra, Cuyahoga Falls; Frank Rukovens, Tallmadge, all of Ohio

[73] Assignee: Norton Chemical Process Products Corporation, Stow, Ohio

[*] Notice: This patent is subject to a terminal disclaimer.

[21] Appl. No.: 09/073,789

[22] Filed: May 6, 1998

Related U.S. Application Data

[63] Continuation-in-part of application No. 08/935,813, Sep. 23, 1997, which is a continuation-in-part of application No. 08/792,348, Feb. 5, 1997, Pat. No. 5,762,834.

[51] Int. Cl.[6] .................................................. B01F 3/04
[52] U.S. Cl. ........................................................... 261/114.4
[58] Field of Search ......................... 261/114.1, 114.2, 261/114.3, 114.4

[56] References Cited

U.S. PATENT DOCUMENTS

| | | | |
|---|---|---|---|
| 3,146,280 | 8/1964 | Forgrieve | 261/114.4 |
| 3,245,669 | 4/1966 | Huggins et al. | 261/114.4 |
| 3,770,255 | 11/1973 | Nutter | 261/114.4 |
| 5,360,583 | 11/1994 | Nutter | 261/114.3 |
| 5,762,834 | 6/1998 | Hauser et al. | 261/114.3 |

FOREIGN PATENT DOCUMENTS

| | | | |
|---|---|---|---|
| 466892 | 8/1975 | U.S.S.R. | 261/114.4 |
| 757168 | 8/1980 | U.S.S.R. | 261/114.4 |
| 959798 | 9/1982 | U.S.S.R. | 261/114.4 |
| 980743 | 12/1982 | U.S.S.R. | 261/114.4 |

*Primary Examiner*—C. Scott Bushey
*Attorney, Agent, or Firm*—David Bennett

[57] ABSTRACT

A mass transfer device is provided in the form of a tray having moveable valves which includes perforations spanned by bridge members shaped to divert liquid flowing in the design flow direction around the perforation such that gas rising through the perforation causes the valve to open and then encounters the liquid flow essentially at right angles.

8 Claims, 1 Drawing Sheet

MASS TRANSFER DEVICE

This Application is a continuation-in-part of pending U.S. application Ser. No. 08/935,813 which was filed on Sep. 23, 1997 which is a continuation-in-part of U.S. application Ser. No. 08/792,348 filed Feb. 5, 1997, which is now U.S. Pat. No. 5,762,834.

BACKGROUND OF THE INVENTION

This invention relates to chemical process equipment in which a liquid is contacted with a counterflow of gas. This may be for a variety of purposes such as stripping a component from the liquid stream or absorbing a component into a liquid stream. More generically this invention relates to equipment designed to facilitate mass and/or heat transfer between phases.

The type of equipment to which this invention specifically relates employs cross-flow fractionation trays connected by downcomers. In such equipment a tower is provided with a plurality of fractionation trays arranged generally horizontally within the tower. Each tower has a perforated deck and at least one channel, called a downcomer, in which a liquid flowing over the deck may be collected and channeled to the tray below. In use a gas or vapor is introduced at the base of the tower and passes upwards through the perforations in the decks of the fractionation trays. Meanwhile a liquid is introduced at the top of the tower and percolates downward passing over the fractionation trays and down the downcomers to the tray below.

Upon reaching the tray, the liquid flows across the tray in what is described here as the "design flow direction", which indicates the direction the liquid is intended to flow when the tray is operating in optimum design conditions. The tray is provided with a plurality of perforations through which the gas bubbles continuously at a pressure that, under normal operating conditions, precludes the liquid from passing through the perforation. These perforations, in conjunction with the associated covers, are referred to as "valves" and are designed to permit efficient mass transfer contact between the gas and the liquid. These valves fall into two major groups: fixed and movable. The fixed valves have no moving parts and are properly called "deflectors". The movable are adapted to respond to the pressure of the up-flowing gas by opening or closing the valve. The present invention relates to movable valves.

In the ideal process design, the liquid should be prevented from passing through the valves in the trays by the pressure of gas passing through the perforations in the upward direction. This is a finely balanced process since, if the pressure is too great, the gas will have a shorter transit time within the tower and less efficient contact with the liquid as it flows across the trays and down the tower. The high gas velocity may also cause liquid droplets to be carried up to the tray above, thereby reducing the separation efficiency as a result of back-mixing. On the other hand if the gas flow rate is too low the liquid will penetrate through the valves in the trays, (known as "weeping"), and short-circuit the flow patterns which are intended to maximize liquid/gas contacts.

Fixed deflector designs merely place a cover over a perforation in the tray deck to prevent liquid falling on to the perforation with sufficient velocity to penetrate even when the pressure is at design levels and while design features can minimize this risk, it can not be totally eliminated at low pressures.

In a typical movable valve, a perforation (for example a round hole) is stamped out of the material of the tray. This is then typically covered by the stamped-out shape, (a metal disc in the example), supported on legs or perhaps in a cage where the valve is meant to open and close with the gas pressure.

In a typical valve construction, the cover is made from the material of the tray. As will be seen, in typical valve constructions the dimensions or the aperture dictate the dimensions of the cover which, because the cover is usually formed from the material removed when the aperture is cut. It is for example impossible, using the material removed when the aperture is cut, a quadrilateral cover that will completely cover the aperture. It is also impossible to shape the orifice to create a venturi effect by punching through the material of the tray from the top to create a relatively narrow orifice opening at the bottom which opens into a wider channel at the top surface of the tray. It has been found that venturi effects are often desirable features of fixed valves.

The disadvantage of such prior art methods is that the shape of the perforation dictates the shape of the cover. There are therefore limitations that are inherent in the production process. The present invention provides a way of making mass transfer contacting devices in which the shapes of the perforation and cover can both be manipulated to produce the optimum process advantage and efficiency of operation of the device.

The present invention provides a simple mass transfer contacting device that can easily be installed and which provides a highly effective means of contacting liquid flowing over and around the valve with gas flowing up through the valve. Equally importantly, the design is such that the size and shape of the perforations and the covers can be independently optimized for the specific application. In addition the covers can be sized to fit any perforation.

GENERAL DESCRIPTION OF THE INVENTION

The present invention provides a fractionation tray having at least one perforation therein and a design flow direction in the vicinity of said perforation and, spanning the perforation, a bridge member comprising first and second support legs connected by a cover member oriented in the design flow direction in the vicinity of the perforation and wide enough to completely cover the perforation at all points, the legs being adapted to be movable, by a controlled amount, within slots in the surface of the tray in response to pressure differences above and below the tray and to span the perforation, the first leg being a solid member located upstream of the perforation in the design flow direction and having a width that is at least 5% wider, and preferably at least 10% or 20% wider, than the greatest width of the perforation transverse to the design flow direction.

The other support leg can also be a solid member though this is not an essential feature. It can for example comprise a plurality of vertical support elements that together constitute the second leg of the bridge member. The overall width of the second leg, however constituted, is preferably at least 10%, and preferably at least 20% narrower than that of the first leg.

The leg of the bridge member that is located downstream in the flow direction is preferably provided with one or more apertures passing through the wall. These may be provided by holes cut in a solid member or they may be created in effect by having the leg comprise two or more vertical support members separated by a space or spaces which provide the aperture(s). In use a portion of the gas flowing up through the perforation passes through the apertures to minimize any opportunity for liquid hold-up adjacent the surface of the leg. It is also possible to provide, in place of or in addition to such apertures, that the width of the leg be reduced till it is narrower than the widest dimension of the orifice at right angles to the flow direction. This has the same effect of reducing any liquid holdup in the region of the downstream leg.

The legs of the bridge member preferably terminate in tabs that are adapted to cooperate with slots cut into the deck to limit the extent to which the cover can rise above the plane of the tray. The tabs may then be bent over to provide this limitation in possible movement. Alternatively other means of achieving the same objective may be provided. For example the tabs may be provided with aligned holes to accommodate a rod passing through both, or each tab may be twisted slightly on the underside of the tray such that the tabs are no longer aligned with the slots through which they pass.

The cover member connecting the legs may be a simple horizontal, flat plate or it may be provided, at least on the underside, with a rib member aligned along the design flow direction. The purpose of the rib would be to direct the flow of gas arising through the perforation out to the sides. In other embodiments the cover member can comprise a plurality of components that together serve to protect the perforation against access of liquid approaching the perforation from above. Thus the cover member may for example comprise two plates that together form a cover with a V shaped, (or inverted V), cross-section in the design flow direction. It is preferred that the cover member, at all points, be at least 10% wider than the width of the perforation at the point directly below it.

The cover member can also be provided with an aperture shaped such that a flow of gas through the aperture is directed essentially horizontally and preferably in the design flow direction. The aperture can be created for example by making a slit in the cover member parallel to the plane of the first leg and deforming the side of the slit nearest the first leg upwards. Alternatively the aperture can have the shape of a hole provided with its own mini-cover member with a design similar to that of a prior art or of the cover members described in the present application. In use such an arrangement is particularly useful if the valve is located under a downcomer such that a liquid flow falls directly on to the cover member. Such a slit aperture increases liquid/gas contact and can facilitate liquid flow in the desired design flow direction.

The cover member is preferably horizontal but it can also be tilted such that one end is higher than the other by providing that the upstream and downstream legs are of different lengths.

The perforation in the tray deck can have any convenient shape and this includes round, elliptical and polygonal. Venturi perforations in which the perforation is made by punching out a suitable shape, usually round, and usually in the downward direction, are particularly advantageous for use with the bridge members of the present invention.

In use a greater gas pressure below the tray causes the valve to open and a liquid flowing in the design flow direction across the deck encounters the first leg member. Since this leg is solid, the liquid flow is split and directed to either side of the perforation. As it passes on either side of the perforation it encounters gas flowing at right angles to the direction of flow of the liquid. This makes for very efficient gas/liquid contact. The different flow directions also make unlikely any weeping of liquid through the perforations. Because the cover member is preferably at least 10% larger than the perforation at all points, the gas flow directing effect is increased and the possibility of weeping is reduced. Reduction of the pressure difference above and below the tray will cause the valve to partially or completely close.

The valves are usually arranged in staggered arrays such that each row of valves across the flow direction is staggered with respect to the valves in the rows in front and behind such that they lie, (with respect to the flow direction), between pairs of adjacent valves in these rows. However any convenient and advantageous placement can be used. For example, if measures are provided to change the flow direction at an intermediate point across the tray, the valves can be correspondingly oriented to reflect the change in flow direction such that some valves may even be at right angles to the orientation of others on the same tray.

DRAWINGS

Figure 1:
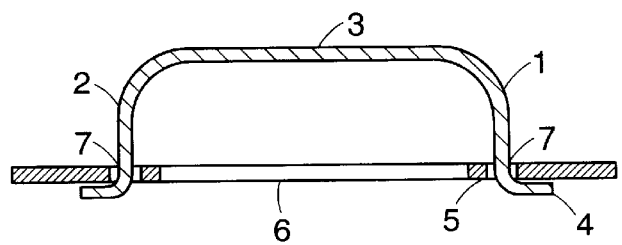
FIG. 1 is cross-section of a valve according to the invention.

In the Drawings the design flow direction is from right to left.

DETAILED DESCRIPTION OF THE INVENTION

The invention is now further described with reference to the Drawings which are intended to illustrate the invention but are not to be understood as implying any essential limitations on the scope of the invention.

Figure 2:
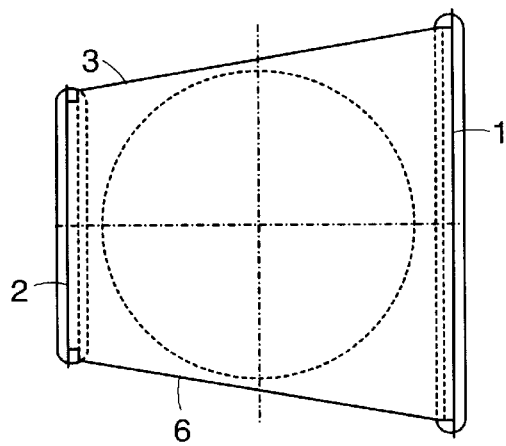
FIG. 2 is a plan view of the valve shown in FIG. 1.
Figure 3:
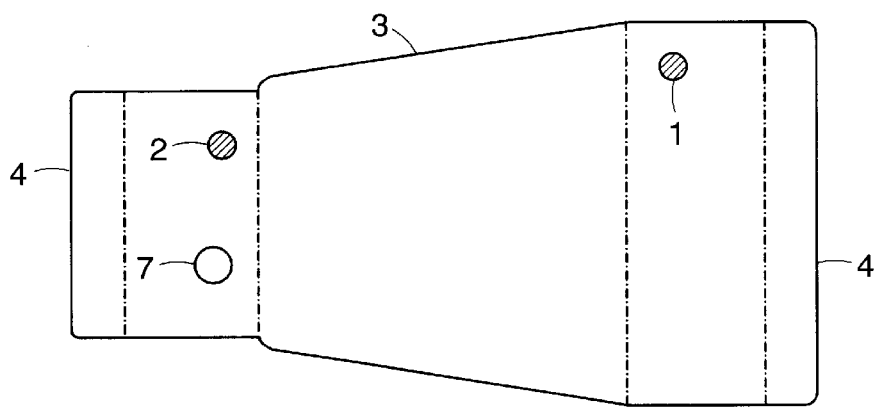
FIG. 3 is a flat plate than can be bent to provide the valve cover shown in FIGS. 1 and 2.

The device illustrated in FIGS. 1 and 2 comprises a bridge member spanning a perforation, 6 in the tray, 5, and comprising first and second legs, 1 and 2 respectively, connected by a cover member, 3. The legs terminate in tabs, 4, which pass through slots, 7, cut in the tray, 5. The tabs below the level of the tray are bent over to prevent removal of the bridge member. FIG. 3 shows a flat metal plate stamped to provide a bridge member according to the invention when bent along the dotted lines to form first and second legs. The aperture, 8, in the narrower of the two legs, (the downstream leg), is intended to allow a gas flow through the aperture to minimize liquid buildup on the downstream face of the leg.

Figure 4:
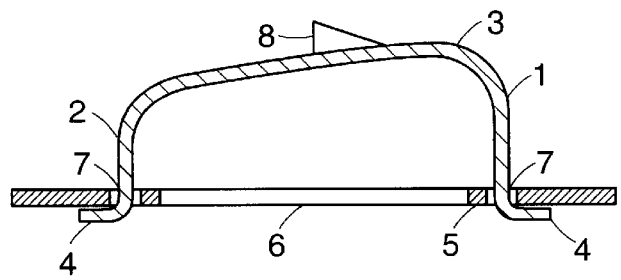
FIG. 4 is cross-section of a valve according to the invention showing legs of different length and a flow directing aperture in the cover member.

In FIG. 4 leg, 1, is longer than leg, 2, such that the cover member, 3, slopes downward towards the second leg. The cover member also has a directing slot, 8, formed by cutting a slit in the cover member and deforming the side of the slit adjacent the first leg upwards.

In use the first leg of the bridge member is located at right angles to the design flow direction. Thus liquid flowing across the tray encounters the face of the first leg and is deflected sideways and around the perforation. This slows down the flow and ensures that the contact of gas with liquid, other than the gas flowing through the apertures in the second leg, will be essentially at right angles.

In operation a tray has a large number of perforations which are usually circular, though other shapes such as elliptical and even polygonal are usable. The preferred locations of the perforations on the tray is in lines across the design flow direction with adjacent lines staggered such that the perforations in one line are between pairs of perforations in the lines on either side along the design flow direction.

This ensures that the flows are repeatedly split and combined to ensure that no flow of liquid develops that is not contacted by the up-rising gas.

The performance of the mass transfer contacting device illustrated in FIG. 1 of the drawings was compared with a standard single weight movable valve with the same perforation dimensions, in identical tray environments and under identical liquid flow conditions. The prior art movable valve comprised a flat cover larger than the perforation and provided with three peripherally and uniformly spaced legs extending perpendicular to the cover and below the lower surface of the tray with stops at the lower extremities to prevent the cover rising beyond a pre-determined point. The valve according to the invention was evaluated in the permanently open configuration to show the advantages of the design under the most challenging conditions.

It is found very useful to compare the "flood point" for each device at a range of gas flow rates. The flood point is reached when the integrity of the liquid and gas flows are lost and the tower fills up with liquid. Thus the flood point defines an extremity of the permitted operating range for a tray. The flood point for the device according to the invention was compared with the standard prior art valve at a range of gas flow rates. The measured flood point figures for the two devices are shown in the Table below.

It is also useful to compare the performances at the opposite end of the permitted operating range, that is the required pressure drop across the tray at low gas flow rates before the valves of the prior art close and no longer permit mixing or where excessive weeping makes the device according to the invention ineffective.

In the following Table the ratio of the quoted parameter for the invention device to the same parameter for the prior art movable valve at the same liquid flow rate is given.

In general, for ΔP, smaller is better and for Fp, higher is better. In general it will be seen that the performance of the valve of the invention is as good as, or better than, that of the best prior art valve.

| LFR RATIO | | INVENTION ΔP RATIO | INVENTION Fp RATIO |
|---|---|---|---|
| 1 | Lowest | 0.90 | 1.00 |
|  | Highest | 1.21 | 1.17 |
| 2.5 | Lowest | 0.87 | 0.91 |
|  | Highest | 1.02 | 1.10 |
| 3.0 | Lowest | 0.80 | 0.80 |
|  | Highest | 0.96 | 1.08 |
| 4.0 | Lowest | 0.88 | 0.84 |
|  | Highest | 0.90 | 1.03 |
| 5.0 | Lowest | 0.94 | 0.88 |
|  | Highest | 0.92 | 1.04 |

"LFR" means the normalized liquid flow rate in liters per minute per centimeter of weir. The "LFR RATIO" is the ratio of the actual flow rate to the lowest flow rate used.

"ΔP" means the pressure drop across the tray in cm of water.

"Fp" means the normalized gas flow rate in cm/second based on the active bubbling area.

"Lowest" and "Highest" refer to the indicated performance parameters at the opposed ends of the permitted range of gas flow rate and pressure drop for a given liquid flow rate in the standardized test tower used in the evaluations.

From the above data it can be seen that at lowest gas and liquid flow rates, the device according to the invention performed rather more efficiently than the conventional closable valve since lower pressure drops and gas flow rates were possible for efficient operation. It will readily be apparent therefore that, when operated as a moveable valve that can respond even more effectively to low pressure differences, the performance will be even more effective.

Perhaps more importantly the device according to the invention operates at higher rates and with much lower pressure drops before reaching the flood point.

In a second series of tests the same valves of the invention used in the first series of comparisons and again operated in the fixed open configuration were compared with deflectors made by deformation of the tray material to form a trapezoidal bridge member of essentially the same dimensions as the bridge member in the present invention as illustrated in the drawings. This deflector is described in U.S. Pat. No. 3,463,464. The difference is that the shape of the perforation in the prior art valve is dictated by the shape of the bridge member. As in the previous comparisons, the orientation and spacing of the valves and deflectors on the tray were the same and the materials used, and the gases and liquids contacted were also the same. The results obtained were as follows:

| LFR RATIO | | INVENTION ΔP RATIO | INVENTION Fp RATIO |
|---|---|---|---|
| 1.0 | Lowest | 1.05 | 0.96 |
|  | Highest | 1.22 | 1.08 |
| 2.5 | Lowest | 0.99 | 0.82 |
|  | Highest | 1.33 | 1.22 |
| 3.0 | Lowest | 0.95 | 0.79 |
|  | Highest | 1.24 | 1.20 |
| 4.0 | Lowest | 0.98 | 0.84 |
|  | Highest | 1.07 | 1.16 |
| 5.0 | Lowest | 0.96 | 0.86 |
|  | Highest | 1.09 | 1.20 |

What is claimed is:

1. A mass transfer tray having at least one perforation therein and a design flow direction in the vicinity of said perforation and, spanning the perforation, a bridge member comprising first and second support legs connected by a solid cover member oriented in the design flow direction in the vicinity of the perforation and wide enough to completely cover the perforation, the legs of said bridge member being adapted to move by a fixed amount within slots in the tray in response to pressure differences above and below the tray and to remain attached to the tray so as to span the perforation, the first leg being a solid member located upstream of the perforation in the design flow direction and having a width that is at least 5% wider than the greatest width of the perforation transverse to the design flow direction.

2. A mass transfer tray according to claim 1 in which the first leg is at least 10% wider than the greatest width of the perforation in the design flow direction.

3. A mass transfer tray according to claim 1 in which the first support leg is longer than the second support leg such that the cover member slopes downward in the design flow direction.

4. A mass transfer tray according to claim 1 in which the support legs of the bridge member are provided with right angled extensions cooperating with openings in the tray to provide means for limiting the amount of movement of the legs within slots in the tray.

5. A mass transfer tray according to claim 1 in which the second support leg is provided with apertures passing through the leg.

6. A mass transfer tray according to claim 1 in which the first and second support legs are of equal length.

7. A mass transfer tray according to claim 1 in which the perforations are venturis.

8. A mass transfer tray having at least one perforation therein and a design flow direction in the vicinity of said perforation and, spanning the perforation, a bridge member comprising first and second support legs connected by a solid cover member oriented in the design flow direction in the vicinity of the perforation and wide enough to completely cover the perforation, the support legs of said bridge member being adapted to move within slots in the tray in response to pressure differences above and below the tray and to be attached to the tray so as to span the perforation, the first support leg being a solid member located upstream of the perforation in the design flow direction, wherein the perforation has a different shape from the cover member and wherein the first support leg is at least 5% wider than the perforation at any point transverse to the design flow direction.

\* \* \* \* \*